J. H. CORE.
SPEED CONTROLLED GAS CUT-OFF FOR MOTOR VEHICLES.
APPLICATION FILED OCT. 4, 1917.
1,284,604.
Patented Nov. 12, 1918.
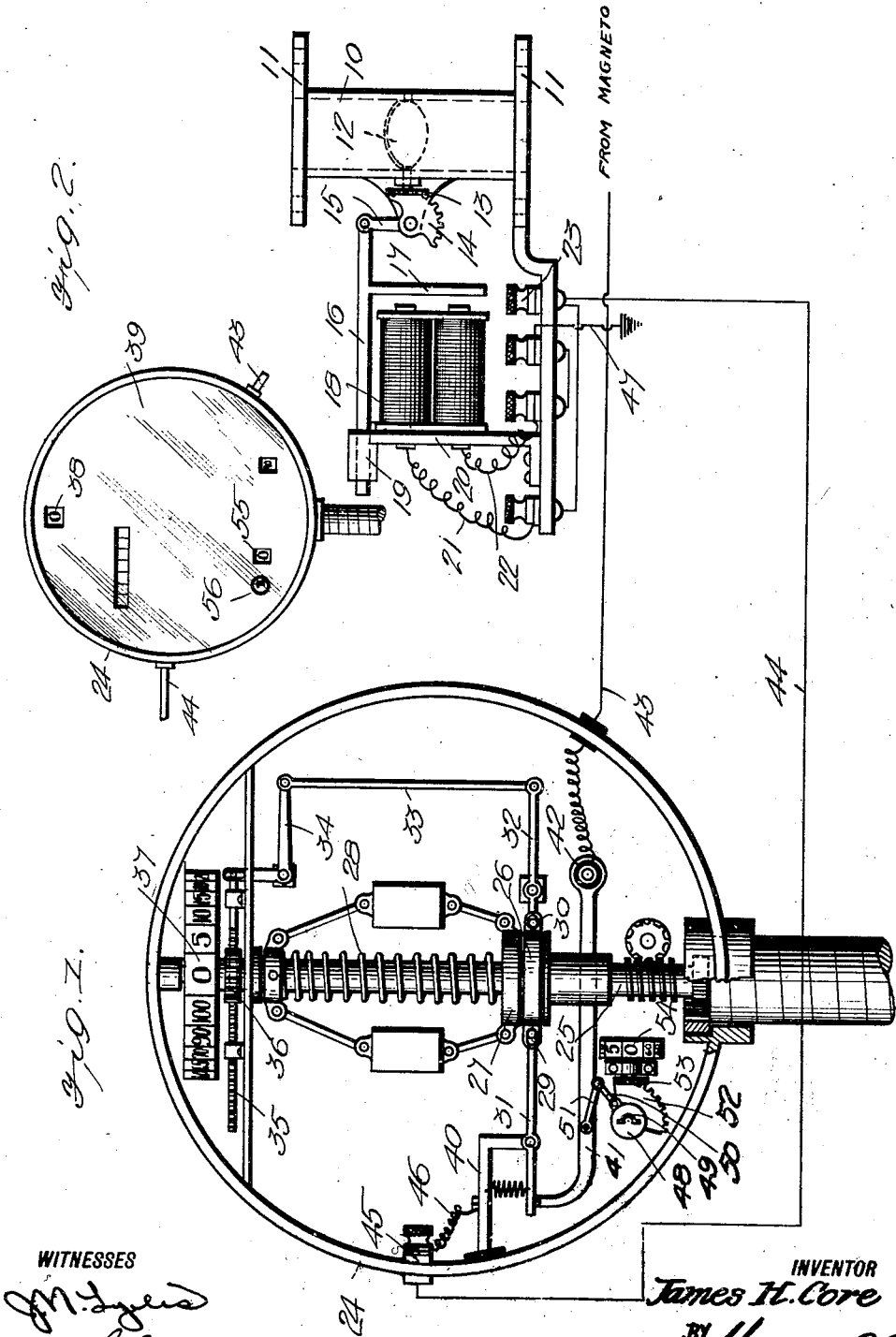

UNITED STATES PATENT OFFICE.

JAMES HENRY CORE, OF NASHVILLE, TENNESSEE.

SPEED-CONTROLLED GAS CUT-OFF FOR MOTOR-VEHICLES.

1,284,604.   Specification of Letters Patent.   Patented Nov. 12, 1918.

Application filed October 4, 1917. Serial No. 194,736.

*To all whom it may concern:*

Be it known that I, JAMES H. CORE, a citizen of the United States, and a resident of Nashville, in the county of Davidson and State of Tennessee, have invented a new and useful Improvement in Speed - Controlled Gas Cut-Offs for Motor-Vehicles, of which the following is a specification.

My present invention relates generally to means for checking the movements of motor vehicles, and particularly to speed controlled means for cutting off the gas supply of such vehicles, for the purpose stated, my object being the provision of simple uniformly effective means adapted to a valved gas supply pipe, whereby to close the valve thereof and cut off the gas supply, the means directly actuating the valve, being in turn controlled as to their operation, and rendered operative and inoperative by, other means in turn controlled by the speed of the vehicle itself.

More particularly, my invention resides in the features of construction, arrangement and operation to be now described with reference to the accompanying drawing, forming a part of this specification, and wherein:

Figure 1 is a view partly in elevation and partly in section, and generally of a diagrammatic nature, illustrating my improvements, and Fig. 2 is a front elevation of the speedometer forming a part thereof.

Referring now to these figures, my invention contemplates the provision of a pipe section 10 with flanged ends 11, for insertion within the gas supply pipe of an automobile or other motor vehicle, between the carbureter and the intake manifold, the pipe section 10 having an internal valve 12, preferably of the butterfly type shown, and in its nature a cut-off valve, the stem of which is provided with a gear wheel 13 engaged by a gear segment 14. This gear segment has an upright arm 15 pivotally connected to one end of an armature slide bar 16 with which the armature 17 of an electro-magnet 18 is rigid, the opposite end of the said bar 16 sliding in a bearing 19 secured to a part of the frame 20 of the electro-magnet.

The circuit wires 21 and 22 of the electro-magnet lead through binding posts 23, respectively, to the casing 24 of a speedometer and an electrical source, for instance the magneto of the vehicle, (not shown.)

In order to energize the electro-magnet 18 for the purpose of closing the valve 12, the speedometer 24 includes a rotatable driven shaft 25, and an actuating ring 26 carried by the movable sleeve 27 of its centrifugal device, the movement of which sleeve is under control of a spring 28. The ring 26 has slotted diametrically opposed side extensions 29 and 30, respectively engaging the inner ends of intermediately fulcrumed levers 31 and 32, the latter being connected, through a connecting rod 33 and bell crank lever 34, with a rack bar 35 in turn engaging a gear wheel 36 upon the shaft of the speed indicating wheel 37, the latter of which shows through an upper sight opening 38 of the front plate 39 of the speedometer, as seen in Fig. 2, in use.

The lever 31 which is shiftable with the lever 32, when the ring 26 is shifted on the shaft 11, is fulcrumed upon a bracket 40 and is adapted for engagement with one end of a contact arm 41, the opposite end of which is pivoted at 42 within the casing 24 and receives one end of a wire 43 leading, for instance, from the magneto of the vehicle in connection with which my improvements are utilized.

A continuation of the wire 21, as seen at 44, leads to the casing 24 of the speedometer and is there connected to a binding post 45, the latter being joined by a short section of wire 46 to the bracket 40, the latter of which is insulated from the casing 24, as is the contact arm 41.

Thus, as the speed of the vehicle increases to the point where the lever 31 is shifted into contact with the arm 41, a circuit is completed from the magneto or other source of circuit, through wire 43, contact arm 41, lever 31, bracket 40, wire 46, wire 44, wire 22, electro-magnet 18, wire 22, and a wire 47, to ground.

It is obvious from the above that the exact point in the speed of the vehicle at which the gas is to be cut off, may be conveniently regulated by adjusting the arm 41 with respect to the lever 31, and in order to do this, I provide the lower portion of the speedometer casing with a shaft 48 having an axially extending key slot 49 in the outer end, and provided with an arm 50 connected by a link 51 with the said arm 41, shaft 48 also having a gear segment 52 engaging the gear 53 of an indicating wheel 54, the latter of which shows through a sight opening 55 of the front plate 39 of the casing, as seen in Fig. 2, at a point adjacent to the opening 56 through which access may be had to the key-actuated shaft 48.

Thus, not only may the contact arm 41 be adjusted so as to vary the point in the speed of the vehicle at which the valve 12 will be closed to cut off the gas supply of the motor, but such point may be determined at all times by reference to the indicating wheel 54, by turning which to the zero point, the arm 41 may be held in contact with the lever 31 so that the valve 12 being then closed, the vehicle will be locked against movement.

I claim:

The combination with the gas supply pipe of a motor vehicle, having a cut-off valve, of electrically actuated means having connection with said valve for closing the same, means forming a circuit through said electrically actuated means and including a pair of normally spaced contact levers, a speedometer including a movable part having connection with one of said levers for shifting the latter into and out of operative position, and means for adjusting the normal position of the other of said levers with respect to the first-named lever.

JAMES HENRY CORE

Witnesses:
L. H. HOLT,
B. SONNBERG.